UNITED STATES PATENT OFFICE 2,674,590

PREPARATION OF THERMOPLASTIC AROMATIC POLYPHOSPHATES

Henryk Zenftman, Saltcoats, Scotland, assignor to Imperial Chemical Industries Limited, a corporation of Great Britain No Drawing. Application March 22, 1950, Serial No. 151,298

Claims priority, application Great Britain May 30, 1949

1 Claim. (Cl. 260—61)

The present invention relates to the production of new artificial resinous materials which exhibit an especially favourable combination of physical and chemical properties.

The new artificial resinous materials produced according to the present invention are poly-condensation products that have the chemical character of linear aromtic polyphosphates in which the phosphorus atoms are in the long chain and linked to two chain-forming aromatic esterifying groups and to one branch aromatic esterifying group containing a diphenyl group.

These new materials are insoluble in water, alcohol, ether, paraffins, but are soluble in chloroform, dioxane and mixtures of benzene and alcohol in certain proportions and various other mixtures or organic liquids which individually fail to dissolve them. They can also be dissolved in relatively small proportions of benzene and toluene to form concentrated solutions. Solutions of these resins are clear, transparent viscous liquids. The new resinous materials become soft and fuse when sufficiently heated. They do not exhibit heat hardening properties. The resins are of extremely good clarity, high refractivity and are usually of a pale or colourless appearance. By using volatile solvents the resins can be applied by means of spraying, brushing or dipping as coatings on metals, glass, wood, rubber and many other surfaces and the coatings so obtained are of high gloss and good flexibility and are well adapted for protecting metal surfaces against corrosion. They are highly resistant to water and acids. Moreover solutions of the new resinous materials produced according to the present invention in solvents containing traces of water or alcoholic constituents can be stored without undergoing hydrolysis or alcoholysis of the branch esterifying group, so that even in such solvents their acid numbers remain substantially constant and the coatings obtained from the solutions retain the water resisting properties characteristic of the freshly manufactured resinous materials. They are of low inflammability and can be heated to about 300° C. without decomposition. At room temperature the resins are of good resistance to abrasion and in thin layers are pliable.

The new resinous materials can also be used as cements for bonding purposes. They can be used as cements for glass, and have a refractive index exceeding 1.6 and give invisible bonds with glasses of the like refractive index. They can also be used for bonding metals, rubber, wood and other materials. They are excellent binding agents for insoluble fillers, pigments and the like; and by incorporating these into the artificial resinous materials produced according to the invention at temperatures above the softening point, thermoplastic compositions of high toughness and attractive mechanical properties are obtained.

These thermoplastic compositions may be used for making gramophone records and similar articles which can be moulded to give sharp contours.

According to the present invention the process for the production of the new artificial resinous materials comprises condensing an aryloxy-phosphoryl dichloride wherein the aryloxy group comprises a diphenyl or substituted diphenyl group with a dihydroxy-aromatic compound both hydroxyl groups of which are nuclear and are attached to non-adjacent carbon atoms.

Preferably the aryloxy-phosphoryl dichloride and the dihydroxy-aromatic compound are in equimolecular proportions.

The said condensation is preferably effected by heating a mixture of the said compounds until the required resinous properties have been developed in the reaction mixture. Preferably the reaction is effected by heating for several hours at temperatures rising progressively as the reaction proceeds from say 100° C.–180° C. at the start to say 190°–240° C. It is desirable slowly to stir the reaction mixture particularly as its viscosity begins to increase. It is to be understood that moisture must be excluded during the reaction. It is preferable to carry out the reaction in an inert atmosphere as for example nitrogen or carbon dioxide. The reaction may be carried out at normal or reduced pressures and it is preferable to apply suction towards the end of the reaction to remove traces of hydrogen chloride from the viscous product. The presence of hydrogen chloride elimination catalysts, as for example metallic tin, is sometimes desirable to assist the progress of the reaction.

The said condensation may also be effected by treating the aryloxy-phosphoryl dichloride containing the diphenyl group with the dihydroxy-aromatic compound in a common solvent and including in said solvent a hydrogen chloride "acceptor." As examples of a common solvent may be mentioned: ether, benzene, chloroform. The "acceptor" may be for example a tertiary amine as for example pyridine.

The new resinous materials formed according to the process of the present invention may, if desired, be purified. For example, they may be dissolved in benzene and subsequently precipitated from these solutions by the addition of ether. The precipitate may be further malaxated with fresh ether and subsequently dried under normal or reduced pressure.

The new artificial resinous materials may be considered to contain a recurrent grouping

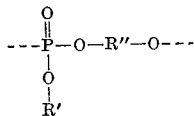

where R' is the diphenyl or substituted diphenyl radicle present in the aryloxy-phosphoryl dichloride

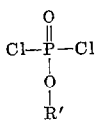

and R'' is the aromatic radicle present in the aforesaid dihydroxy-aromatic compound.

The aforesaid dihydoxy-aromatic compound whereof both hydroxyl groups are nuclear and attached to non-adjacent carbon atoms, may have one or more aromatic nuclei in its molecule, and in the latter case its hydroxy groups may advantageously be present in different nuclei; e. g., in the para or meta position to one another in a monocyclic dihydroxy-compound or in the 4:4' position in the case of a diphenyl derivative.

As the aryloxy-phosphoryl dichloride there may be used for instance paraphenyl phenoxy-phosphoryl dichloride, or orthophenyl-phenoxy-phosphoryl dichloride. These compounds may be prepared by treating para-phenyl-phenol, or ortho-phenyl-phenol, at raised temperature with more than one molar proportion of phosphorus oxychloride, preferably in presence of calcium chloride or iron as a catalyst, until the whole of the aromatic hydroxy compound present has been consumed.

As the dihydroxy-aromatic compound in which both hydroxyl groups are nuclear and attached to non-adjacent carbon atoms there may be used, for instance, hydroquinone, resorcinol or chlorinated hydroquinone, or dihydroxy diphenyls for instance 4:4'-dihydoxy-diphenyl or 4:4'-chlorinated dihydroxy-diphenyl, or 4:4'-dihydroxy dibenzyl, or 4:4'-dihydroxy diphenyl ether.

Resinous aromatic polyphosphate polymers in which the repeating unit consists of

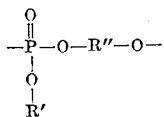

wherein R' is selected from the group of aryl radicles consisting of phenyl, chlorinated and brominated phenyl and lower alkyl substituted phenyl radicles and R'' is an aromatic radicle having its O bondage attached at non-adjacent carbon atoms are preferably not stored in solutions containing alcohol as the acidity of these solutions increase on storage. On the other hand the new resinous aromatic polyphosphate polymers of the present invention wherein R' is selected from the group of aryl radicles consisting of diphenyl and substituted diphenyl radicles can be stored in solutions containing alcohol without any noticeable increase in acidity. The new artificial resins produced in accordance with the present invention have also a greater resistance to hydrolysis than those resins wherein R' is selected from the group of aryl radicles consisting of phenyl, chlorinated and brominated phenyl and lower alkyl substituted phenyl radicles.

The invention is illustrated by the following examples.

*Example I*

A mixture of equimolecular proportions of paraphenyl phenoxy-phosphoryl dichloride (boiling point 160°/0.5 mm.) M. P. 78° and hydroquinone is heated on a metal bath in a glass vessel provided with slow stirring, and an air condenser from the end of which a tube leads to a hydrogen chloride absorption liquor. The contents of the vessel are protected from access of moisture by a calcium chloride tube. Hydrogen chloride begins to be evolved at a bath temperature about 150° and as the reaction proceeds for seven hours at this temperature the reaction mixture gradually becomes a clear liquid. When 50% of the expected hydrogen chloride is eliminated the bath temperature is gradually increased to 180–185° C. Heating is discontinued after a total heating time of 25 hours, when evolution of hydrogen chloride practically ceases and the viscosity at 85° C. of the reaction mixture ceases to rise.

The resulting crude resinous product while fluid is poured out of the vessel and is allowed to cool to room temperature. It forms a straw coloured transparent resin having good adhesion to glass and metals. Its softening point as determined by the ball and ring method is 115° C. The acid number of the crude resin is 11.

A sample of the crude resinous material is purified by dissolving it in benzene and precipitating with ether, which removes practically all the progenitor compounds. The acid number of the purified resin is 10.

The resin described in the foregoing example is soluble in chloroform and in benzene alcohol mixtures (80:20 by volume).

The difference in behaviour on storage of the resin prepared in accordance with the foregoing example and of a resin prepared in a similar fashion from 2:4 dichlorophenoxy phosphoryl dichloride and hydroquinone is shown by the following comparative experiments.

10 grams of resin prepared in accordance with the foregoing example are dissolved in a mixture of 30 ccs. methylated spirit and 70 ccs. benzene. Part of the solution is titrated immediately and the acid number is 10. The remainder of the solution is stored for 30 days and a portion is again titrated and again gives an acid number of 10. The resin which is obtained by evaporation of a portion of the so-stored solution remains clear after more than 2 weeks immersion in water.

10 grams of a resin prepared in a similar fashion from 2:4 dichloro-phenoxy phosphoryl dichloride and hydroquinone are dissolved in a mixture of 30 ccs. methylated spirit and 70 ccs. benzene. A part of this solution is titrated immediately and the acid number is 12. The remainder of this solution is stored for 30 days and a portion is again titrated and the acid number is 88. The freshly made solution on evaporation deposits a resin having excellent water resistance but after 30 days storage deposits a deteriorated resin. This deterioration is evidenced by a reduction in the rate of drying and by the development of opacity when the resin is immersed in water for less than one day. If however a sample of the said resin prepared from 2:4 dichloro-phenoxy phosphoryl dichloride and hydroquinone and having an acid number 12 is stored in solution in a mixture of benzene and ethylene chloride under dry conditions for the same period and is then evaporated, the resulting deposit of the resin can be immersed in water for more than two weeks without becoming opaque.

*Example II*

A mixture of equimolecular proportions of orthophenyl phenoxy-phosphoryl dichloride (boiling point 145°/0.4 mm.) and hydroquinone is heated in a similar way as described in Example 1. The reaction begins at 150° C. and after 3 hours heating at 150° it forms a clear liquid. 0.1% of metallic tin is now added and heating is continued at 190° C. The total time required for the completion of reaction is 30 hours. The obtained resin is of pale colour. Its softening point as determined by the ball and ring method is 110° C. The acid number of the crude resin is 12.

*Example III*

A mixture of equimolecular proportions of para-phenyl phenoxy-phosphoryl dichloride (boiling point 160°/0.5 mm.) and 4:4' dihydroxy-diphenyl ether (M. P. 165°) is heated in a similar way as described in Example I. Hydrogen chloride begins to be evolved at a bath temperature of about 180° and after 4 hours heating the mixture becomes a clear liquid. 0.1% of metallic tin, calculated on the total weight of the batch, is now added and heating is continued for another 16 hours at a temperature rising gradually from 180 to 210° C., and finally for 2 hours at 210° C. under reduced pressure (25 mm.). The obtained product is a clear colourless tough resin with an acid number of 14 and softening temperature 190° C. (ball and ring method).

What I claim is:

A process for producing thermoplastic synthetic linear aromatic polyphosphates characterized by their resistance to hydrolysis and alcoholysis and their freedom from decomposition when heated to about 300° C., said process comprising the steps of forming a mixture of equimolecular proportions of (1) an aryloxy-phosphoryl dichloride selected from the group consisting of ortho-phenyl phenoxy-phosphoryl dichloride and para-phenyl phenoxy-phosphoryl dichloride and (2) a dihydroxy-aromatic compound selected from the group consisting of hydroquinone and 4:4' dihydroxy-diphenyl ether, effecting condensation of the reactants by heating said mixture at a temperature of from about 100° C. to 180° C. introducing tin into said mixture as a hydrogen chloride elimination catalyst, and continuing said heating at from about 190° to 240° C. until a resinous condensation product is obtained.

References Cited in the file of this patent

UNITED STATES PATENTS

| Number | Name | Date |
|---|---|---|
| 2,058,394 | Arvin | Oct. 27, 1936 |
| 2,616,873 | Cass | Nov. 4, 1952 |
| 2,636,876 | Zenftman et al. | Apr. 28, 1953 |